United States Patent [19]
Kiang

[11] 4,166,435
[45] Sep. 4, 1979

[54] INTERNAL COMBUSTION ENGINES
[76] Inventor: Deh J. Kiang, 4FL, No. 45, Nanking East Rd., Sec. 4, Taipei, Taiwan
[21] Appl. No.: 895,320
[22] Filed: Apr. 11, 1978
[51] Int. Cl.² ............................................. F02D 19/00
[52] U.S. Cl. ............................ 123/25 B; 123/25 A; 123/25 D; 123/25 F; 261/18 A
[58] Field of Search .......... 123/122 D, 124 R, 119 D, 123/25 B, 25 A, 25 D, 25 F, 25 L, 25 P; 261/18 A, DIG. 76

[56] References Cited
U.S. PATENT DOCUMENTS

| | | | |
|---|---|---|---|
| 1,256,976 | 2/1918 | Brock | 123/124 R |
| 2,152,028 | 3/1939 | Church | 123/124 R |
| 3,974,802 | 8/1976 | Lundquist | 123/122 D |
| 4,030,453 | 6/1977 | Sugimoto | 123/25 P |

*Primary Examiner*—Ronald H. Lazarus
*Attorney, Agent, or Firm*—Ladas, parry, Von Gehr, Goldsmith & Deschamps

[57] ABSTRACT

An internal combustion engine includes at least one combustion chamber and an inlet conduit whereby air for combustion of fuel is introduced into the combustion chamber. The inlet conduit has a main inlet and an auxiliary inlet for introducing main and auxiliary air flows respectively into the inlet conduit. Filtered and heated air is passed through a humidifier and a preheater to an air suction control valve connected between the preheater and the auxiliary inlet to provide the auxiliary air flow. The air suction control valve operates in response to increase in pressure in the combustion chamber to reduce the flow of air from the preheater to the auxiliary inlet.

11 Claims, 11 Drawing Figures

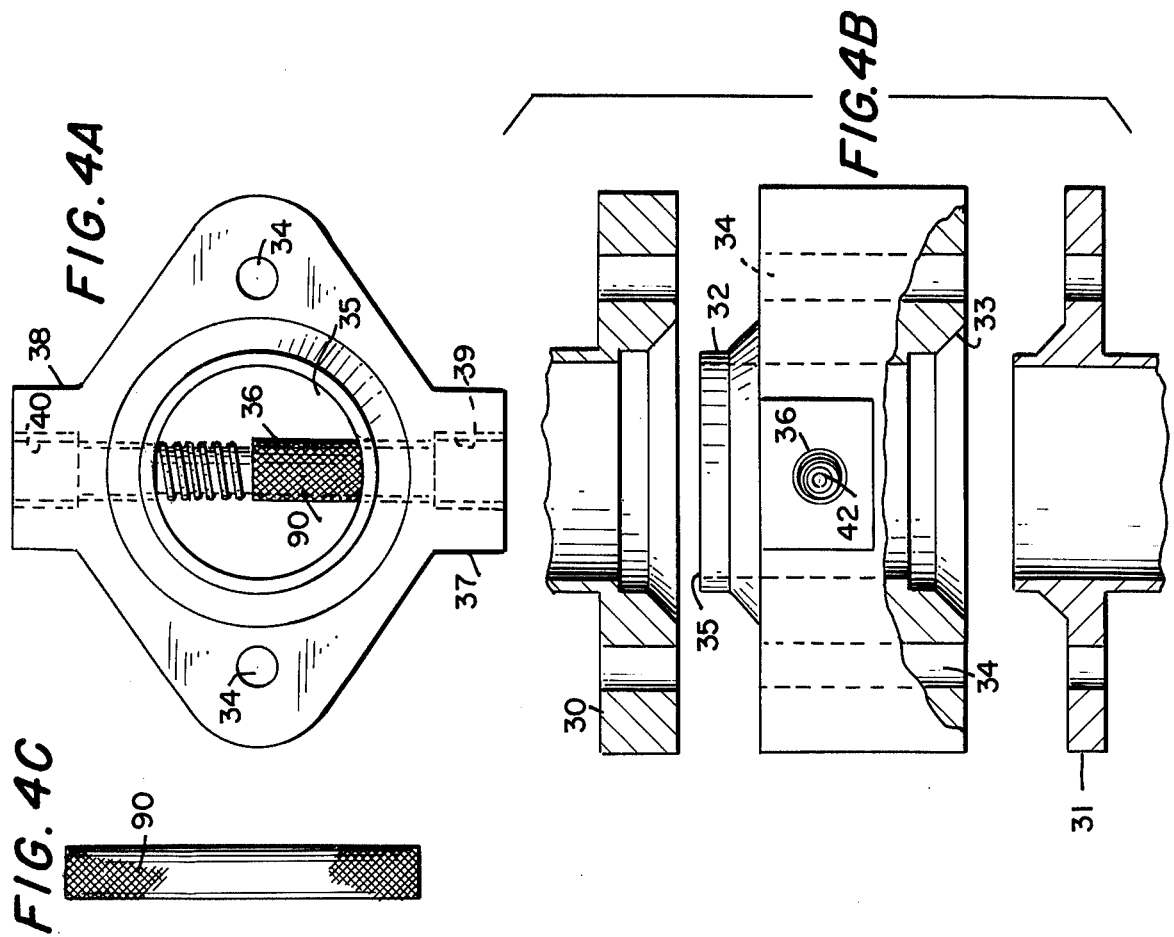
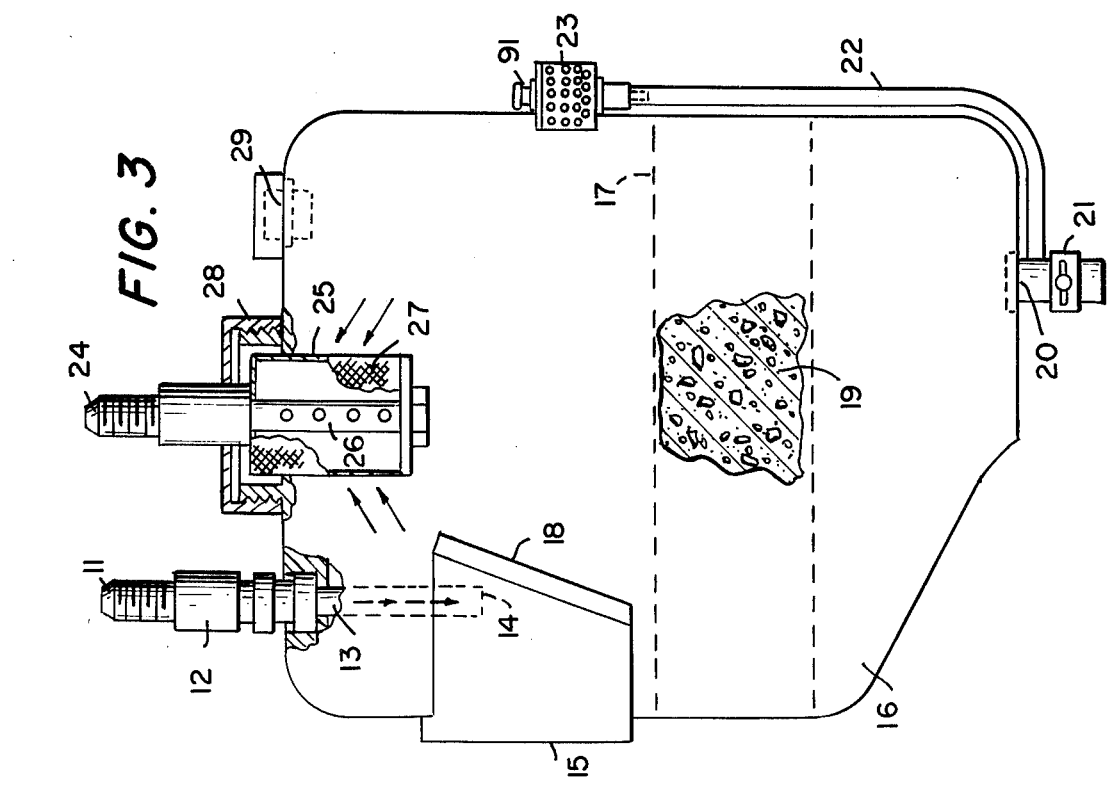

INTERNAL COMBUSTION ENGINES

This invention relates to internal combustion engines, and in particular to means for conditioning a flow of air delivered to the engine for supporting combustion of fuel.

It is known to equip an internal combustion engine with a device for improving the efficiency of the ignition system with a view to obtaining a reduction in the consumption of fuel. This conventional fuel-saving device fails to bring the thermal efficiency of an automatic engine to the theoretical value because the output power of an internal combustion engine is in direct proportion to the amount of fuel burnt yet conventional engines have low volumetric efficiency. It is not difficult to supply sufficient fuel to a cylinder, but it is not easy to make adequate air enter into the cylinder. Therefore, an improved ignition system cannot solve the problem because it does not result in the volumetric efficiency or the completeness of combustion being increased, but only brings about an accelerated combustion. Furthermore, a modification of the original operating system of an internal combustion engine often brings about unfavorable side-effects. Since the degree of air pollution attributable to exhaust gases from automobile is determined by how complete the combustion engine is, the basic solution lies in supplying sufficient air to ensure complete combustion.

According to the present invention there is provided an internal combustion engine, including:

means defining at least one combustion chamber, an exhaust manifold, exhaust pipe means connected to the exhaust manifold for conducting exhaust gases away from the combustion chamber, means defining an air inlet conduit whereby air for combustion of fuel is introduced into the combustion chamber, said air inlet conduit having a main inlet and at least one auxiliary inlet for introducing main and auxiliary air flows respectively into said air inlet conduit and being formed with a venturi constriction at a position downstream of said main inlet, said auxiliary inlet opening into said air inlet conduit at the position of the narrowest region of said constriction, air filter means, air heater means connected to receive filtered air from the air filter means for heating said filtered air and comprising at least two members which are secured together to define a central opening through which said exhaust manifold extends, said members together defining a substantially annular passageway which extends about the exhaust manifold in heat-exchange relationship therewith and is provided with an inlet connection connected to the air filter means and with an outlet connection, a humidifier connected to receive filtered and heated air from the air heater means for humidifying said filtered and heated air and comprising a vessel for containing humidification liquid, said vessel having an upper region at which it is provided with an air inlet connection which is connected to the outlet connection of the air heater means and with an air outlet connection, the vessel having therewithin a sponge member having an upper surface which extends substantially horizontally within the vessel, the shape and size of the upper surface of the sponge member being substantially identical to the shape and size of the horizontal section of the interior space defined by the vessel at the level at which the upper surface is located, preheater means connected to receive the filtered and humidified air from the humidifier for heating said air and comprising a member which defines an opening of substantially the same diameter as the exhaust manifold and the exhaust pipe means and is connected in series between the outlet of the exhaust manifold and the inlet of the exhaust pipe means, and a duct passing diametrically through the opening and having an inlet end which is connected to the air outlet connection of the humidifier vessel and also having an outlet end, and an air suction control valve connected between said preheater means and said auxiliary inlet to said air inlet conduit for controlling passage of air from said preheater means to said auxiliary inlet and comprising a valve body defining a passageway having two ends extending therethrough and connected at one end to said auxiliary inlet and at its other end to the outlet end of said duct, the passageway having a reduced diameter portion intermediate its ends, and the valve also comprising a ball positioned in the passageway between the reduced diameter portion and said one end, an abutment member between said ball and said one end, and a resilient member positioned in the passageway and effective between the abutment member and the ball to urge the ball towards said reduced diameter portion of the passageway for blocking the passageway, whereby said air suction control valve operates in response to increase in pressure in the combustion chamber to reduce the flow of air from the preheater means to the auxiliary inlet.

The present invention makes it possible to solve the aforesaid problems by supplying a compensatory amount of air for combustion so as to reduce the generation of poisonous gas and increase the thermal efficiency of an engine.

The conventional method of injecting water into an engine cylinder to prolong combustion time has a tendency to leave excessive and unatomized water droplets on the cylinder wall. Such droplets tend to corrode the cylinder wall. This problem is avoided in the present invention by use of the humidifier. In the embodiment of the invention to be described hereinafter, the humidified air enters the cylinder together with the air-fuel mixture from the carburetor, so that the vaporized water is evenly distributed in the air-fuel mixture. This uniform distribution of vaporized water not only prolongs the combustion time but also solves the problem of leaving water droplets on the cylinder wall.

For a better understanding of the invention, and to show how the same may be carried into effect, reference will now be made, by way of example to the accompanying drawings in which:

FIG. 3 illustrates a vertical sectional view of the humidifier;

FIGS. 4a and 4b illustrates a top view and a side view respectively of the preheater means;

Figure 1:
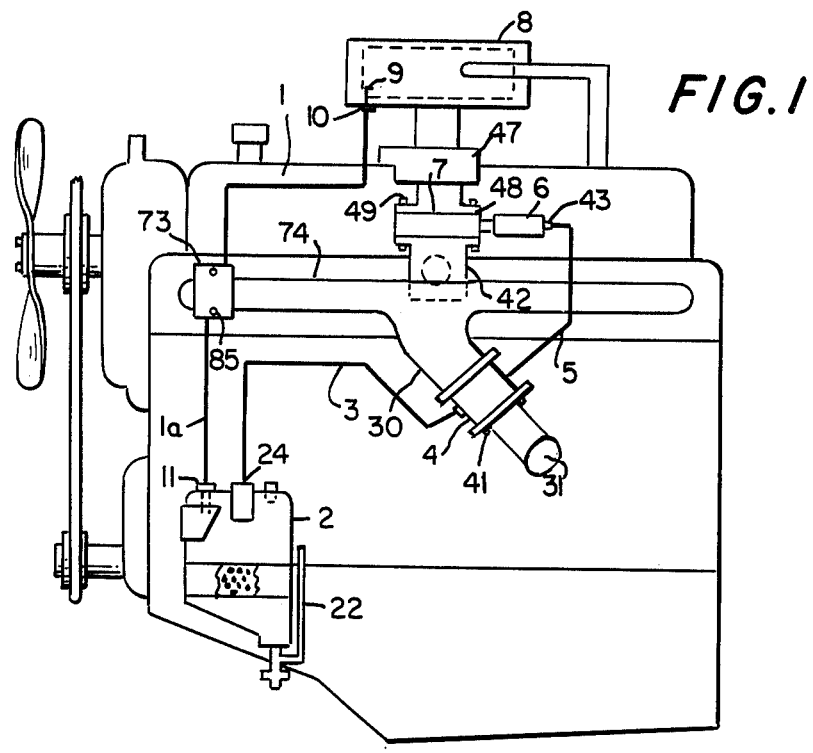
FIG. 1 illustrates diagrammatically a side view of an internal combustion engine embodying the present invention.

Referring to FIG. 1, the systems of the present invention comprises intake pipes 1 and 1a, an air heating ring 73, a humidifier 2, a conduit 3, a preheater 4, a conduit 5, an air suction control valve 6, and a member 7 defining an air inlet conduit. The functions of these members are explained as follows.

The air for the system is furnished by an air filter 8 on the top of the engine. The air inlet 9 of the intake pipe 1 is placed at the bottom of the air filter 8 and secured by an adaptor 10. The intake pipe 1 is made of a copper alloy. Clean air from the air filter 8 passes through the pipe 1 into the air heating ring 73 which is mounted on the engine's exhaust manifold 74. The air heating ring is made of cast aluminum and is so designed as to fit the type of the exhaust manifold used in a gasoline or a diesel engine (such a ring is even more effective for a diesel engine).

Figure 2A:
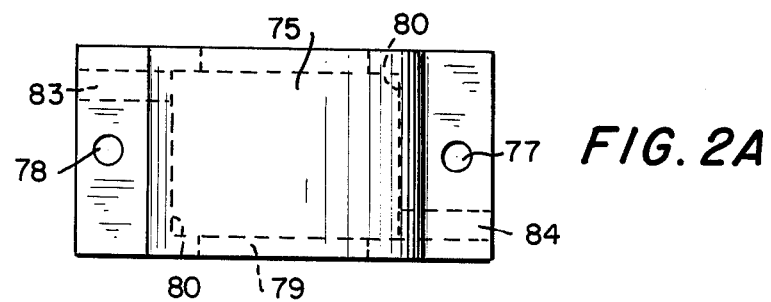
FIGS. 2a and 2b illustrate a top view and a side view respectively of the air heater means of the engine.
Figure 2B:
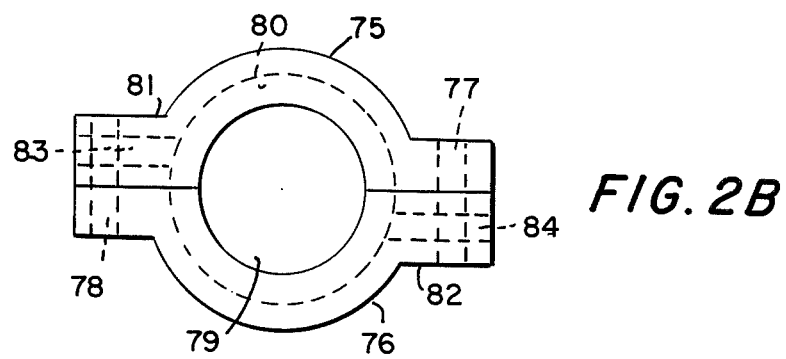

From FIG. 2b it can be seen that the air heating ring is composed of two identical members 75 and 76 each having a semicircular portion which joins together two projecting end portions formed with holes 77 and 78. The members 75 and 76 are combined together to define a central orifice 79 by inserting bolts 85 (FIG. 1) into the holes 77 and 78. The air heating ring can thus be mounted around the exhaust manifold 74 (FIG. 1). Each of the members 75 and 76 is formed at its interior surface (confronting the orifice 79) with a recess 80. The end portions of the members 75 and 76 are not of equal thickness, one end portion of each member being thicker than the other end portion thereof. The thicker end portions 81 and 82 are formed with respective passages 83 and 84 which communicate with the recesses 80. When the air heating ring 73 is in position, with the exhaust manifold 74 (FIG. 1) passing through the central orifice 79, the recesses 80 and the exterior surface of the exhaust manifold define an annular pasage 80 which extends around the exhaust manifold and communicates with the passages 83 and 84. The compensatory air from the intake pipe 1 (FIG. 1) enters the air heating ring through the passage 83, passes through the annular passage 80, and leaves by way of the passage 84 and then the heated air flows into the intake pipe 1a (FIG. 1) which is connected to the humidifier 2. As illustrated in FIG. 1, the humidifier 2, which is made of plastic, is located on the inside wall of the front housing of the engine and has at its top an air inlet 11 which is connected to the intake pipe 1a.

Referring to FIG. 3, the air inlet 11 is secured on the humidifier by a coupling 12, and an inclined plastic plate 18 is located beside the air outlet 14 at the lower end of the air passage 13 which extends from the air inlet 11. The inclined plastic plate 18 is fixed on the plastic wall 15 of the humidifier, which is filled with clean water 16 up to one half of its volume. A space remains between the lower end of the inclined plate 18 and the surface 17 of water. A sponge 19 of the same size as that of the cross section area of the humidifier is placed on the top of water 16. At the bottom of the humidifier, a water drain hole 20 is sealed tightly with a closure 21, and is connected to a plastic pipe 22 extending upward along the external wall of the humidifier. A filter screen 23 is placed on the upper open end of the plastic pipe 22 at a level higher than the water surface 17 and is secured in place by a threaded fastener 91.

At the top of the humidifier, beside the air inlet 11, is an opening provided with a threaded plastic cover 28. The cover 28 has attached thereto a wet air outlet 24, and an air passage 26 extends downward to a wet air filter 25 in the humidifier. The wet air filter has a screen 27 fixed therein. A water filling hole 29 is provided in the neighborhood of the wet air outlet 24.

As illustrated in FIG. 1, the conduit 3 has one end connected to the wet air outlet 24 of the humidifier 2 and the other end connected to the wet air preheater 4. The preheater 4 is mounted at the joint of the outlet 30 of the exhaust manifold and the exhaust pipe 31. To install the wet air preheater 4, the long bolts 41 which connect the manifold outlet 30 and the exhaust pipe 31 are removed and the wet air preheater is inserted between the outlet 30 and the exhaust pipe 31. The long bolts 41 are then replaced so that they extend through the holes 34 (FIG. 4) and are tightened to secure the three members together.

The preheater is made of an aluminum alloy and can be designed to fit exactly the type of the engine exhaust system used. Referring to FIG. 4b, the protruding portion 32 of the preheater is inserted tightly in the manifold outlet 30 (FIG. 1) and its recessed portion 33 receives the exhaust pipe 31 (FIG. 1). The holes 34 are for the insertion of the long bolts 41 which are held in position by nuts (not shown). An exhaust gas passage 35 having an internal diameter substantially the same as that of the exhaust system is provided at the center of the preheater and it communicates with the exhaust manifold outlet 30 (FIG. 1) and the exhaust pipe 31 (FIG. 1). As illustrated in FIG. 4a, passing diametrically across the exhaust gas passage 35 is a wet air pipe 36 which is exposed entirely to the hot exhaust gases and has its ends embedded into the aluminum alloy protrusions 37 and 38 respectively. The threaded front end 39 of the wet air pipe is connected to the wet air conduit 3 (FIG. 1) and the threaded rear end 40 is connected to the hot wet air conduit 5 (FIG. 1).

The external surface of the wet air pipe 36 made of a copper alloy is provided with coarse threads, and a stainless steel screen 90 is installed inside the pipe. After passing through the wet air pipe, the wet air enters into the hot wet air conduit 5 (FIG. 1) from the rear end 40 and then flows into the air suction control valve 6 (FIG. 1).

Figure 5:
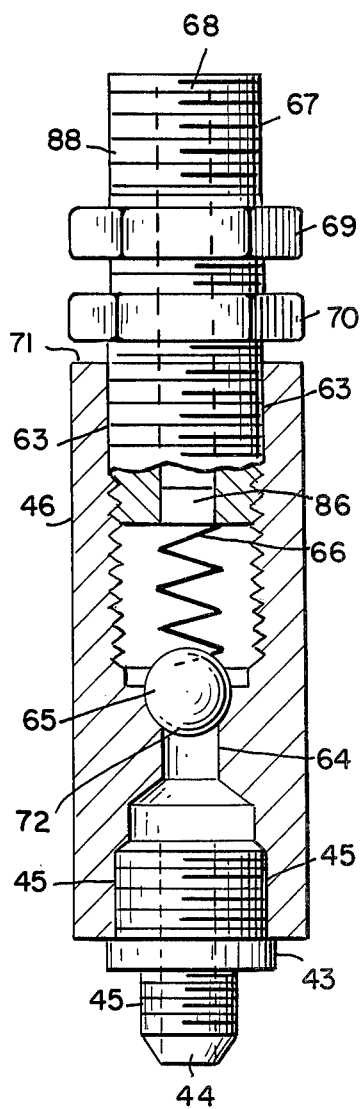
FIG. 5 illustrates a cross-sectional view of the air suction control valve.

Now referring to FIG. 5, a connector 43 having an air inlet passage 44 and external threads 45 connected the hot wet air conduit 5 (FIG. 1) and the air suction control valve body 46. The air suction control valve body 46 is made of a copper alloy, and its upper half is a threaded air channel 63. A movable stainless steel ball 65 is placed on the opening of the narrow air channel 64 at the bottom of the body, and a spring 66 is provided on top of the stainless steel ball 65.

The air suction control valve body 46 is connected to the member 7 (FIG. 1) by a connector 67 (also made of a copper alloy) which has an air outlet passage 68 at its central portion. A fixed fastening ring 69 locks the connector 67 in the threaded passage 63 of the air suction control valve body 46, while a movable fastening ring 70 can be moved on the connector 67. When the movable fastening ring 70 abuts against the top edge 71 of the air suction control valve body 46, it can control the length of the connector 67 inside the air suction control valve body 46 and the upper threaded section 88 of the connector 67 is then connected to the member 7 (FIG. 1). At this time, the air outlet passage 68 of the air suction control valve communicates with the member 7 (FIG. 1) to pass through the humidified air. A notch 86 is at the lower end of the air outlet passage 68.

Referring to FIG. 1, the member 7 is installed underneath the carburetor 47 and connected to the main intake pipe 42. To install the member 7, the carburetor 47 must be removed so that the member 7 can be placed beneath the air-fuel mixture outlet support 48 of the carburetor 47 and connected to the main intake pipe 42. Then the three members are mounted together by four fixing screws 49.

The member 7 is also made of an aluminum alloy and can be designed to fit the different types of carburetors. The member 7 shown in FIG. 6 is designed for a twin-barrel carburetor (twin-choke unit). The protrusion 50 is connected to the air suction control valve 6 (FIG. 1). There is an air channel 51 at the center of the protrusion 50 and two small air passages 52 and 53 are provided at each side of the end of the air channel 51. The small air passages 52 and 53 communicate with two short air-fuel mixture intake pipes 54 and 55 respectively.

Figure 6A:
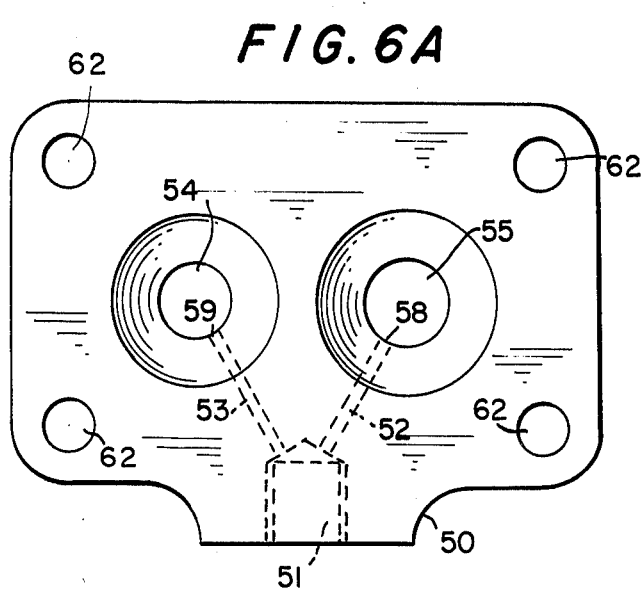
FIGS. 6a and 6b illustrate a top view and a side view respectively of a member defining the air inlet conduit.
Figure 6B:
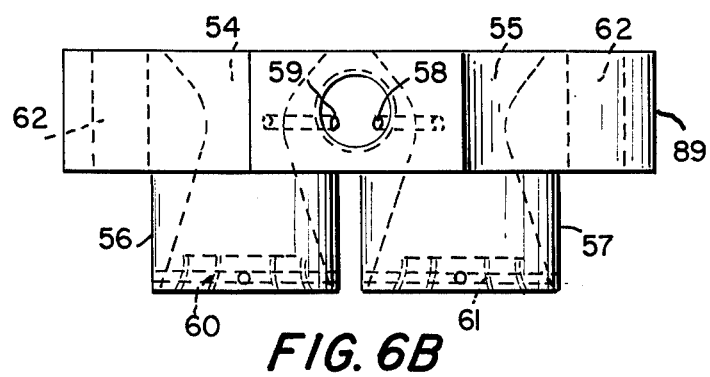

Now referring to FIG. 6b, the upper portions of the short intake pipes 54 and 55 are connected to the air-fuel mixture outlet support 48 (FIG. 1) of the carburetor. The air-fuel mixture from the carburetor flows through the short intake pipes 54 and 55 and through sleeves 56 and 57 which are inserted in the main intake pipe 42 (FIG. 1). The short intake pipes 54 and 55 are Venturi tubes and their narrowest portions are positioned at the center of a top plate 89 where the air outlets 58 and 59 of the two small air passages 52 and 53 are exposed (FIG. 6b).

Figure 6C:
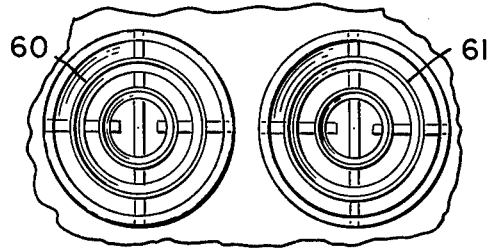
FIG. 6c illustrates a top view of a two-blade separating plate mounted in the air inlet conduit.

As illustrated in FIG. 6c, the sleeves 56 and 57 have respective two-blade separating plates 60 and 61 provided at their bottoms to divide the flow of air-fuel mixture for the respective cylinders. The member 7 has four threaded holes 62, one hole being at each corner as shown in FIGS. 6a and 6b, and four fastening screws 49 (FIG. 1) are inserted in these holes respectively to secure the member 7 tightly.

The systems of the present invention functions as follows:

1. Source of air: As shown in FIG. 1, the compensatory air required for the system is furnished by the air filter 8 through the air inlet 9 inside the filter screen in the air filter. Therefore, the compensatory air is clean.

2. Air heating ring: As shown in FIG. 2, when the clean air enters the air inlet passage 83 and flows through the annular passage 80 of the air heating ring, the heat from the exhaust manifold 74 (FIG. 1) will raise the temperature of the air. When the heated air enters the humidifier 2 (FIG. 1), its heat will dissipate to cause vaporization of the water in the air humidifier and increase the humidity of the air. Also the high temperature of the exhaust manifold 74 (FIG. 1) is lowered.

3. Air humidifier: As shown in FIG. 3, the heated air flows into the air humidifier through the air inlet passage 13. At the air outlet 14, the plastic inclined plate 18 will enable the heated air to pass over the water surface 17 without causing air turbulence, and this ensures that air will not leave the humidifier without being humidified. The sponge 19 placed above the water stabilizes the water surface 17. When the heated air passes over the water surface 17, some of the moisture permeates into the air. The water drain hole 20 also functions as a water overflow outlet by virtue of its connection to the pipe 22 which, as noted, terminates above the level of the surface 17. This ensures that the water will not drain from the humidifier to a level below the surface 17 by way of the pipe 22. The filter screen 23 ensures that foreign matter cannot enter the humidifier by way of the pipe 22. The pipe 22 also serves as an air inlet for the supplementary air (if the amount of air entering the air humidifier by way of the air inlet passage 13 is insufficient), entering through the filter screen 23. The filtered supplementary air will bubble through the clean water 16, thereby keeping the water in motion and increasing the vaporization of the water. The filter screen 27 of the wet air filter 25 serves as a general screening net to prevent impure materials or unvaporized droplets from getting into the system.

4. Wet air preheater: As shown in FIG. 4, the wet air pipe 36 is exposed entirely to the hot exhaust gases in the exhaust gas passage 35. When the wet air flows through the wet air pipe 36, it is heated owing to the high temperature of the exhaust gases, and the external threaded portion of the said pipe enlarges the heat absorption. Furthermore, the stainless steel screen 90 serves as means for storage of heat energy and uniformly heats and vaporizes the wet air that flows therethrough to increase the combustibility of the air-fuel mixture as well as the uniformity of its distributing. This is especially effective during the starting of an engine or in a comparatively cold climate. Also, by heating the wet air the thermal load of the exhaust system will be reduced reducing the amount of poisonous gas produced therefrom. 5. Air suction control valve: As shown in FIG. 5, the air suction control valve consists of a main body 46 and two connectors 43 and 67. When a low pressure prevails in the cylinder, the hot wet air is sucked into the air suction control valve through the air inlet passage 44. The spring 66 is then compressed upward and the stainless steel ball 65 is raised, leaving the opening 72 of the narrowed passage 64 wide open so that the hot wet air is sucked into the main body 46 and passes through the air outlet passage 68 of the connector 67 on its way to the cylinder. When the spring 66 is compressed upward, the ball 65 will not seal off the passage because the notch 86 at the lower end of the connector 67 still keeps the passage open to let the hot wet air pass through.

6. Member 7 (For use on diesel automobiles, the short pipe hot wet air flow control means is securely mounted at the air outlet of the main intake pipe.): As shown in FIG. 6, the short air-fuel mixture intake pipes 54 and 55 are venturi tubes with the narrowest section located at the compensatory air outlets 58 and 59. When the air-fuel mixture from the carburetor (a low pressure prevails in the cylinder) passes through the narrowest section of the short intake pipes 54 and 55, the tapering part of the venturi tubes will cause faster moving of the mixture and a low pressure in the air outlets 58 and 59. The compensatory air is thus sucked into the air outlets 58 and 59 and delivered to the cylinder together with the mixture from the carburetor for further atomization, thereby offering the best mixing of fuel and air and forming an extensive volume of fuel/air mixture for complete combustion of the fuel to eliminate the possibility of leaving a layer of residual unburned fuel on the cylinder wall. The rate of narrowing of the tapering part of the venturi tubes is determined by the amount of compensatory air required by the cylinder so as to avoid the occurrence of back pressure and the over- or under-compensatory effects. The two-blade separating plates 60 and 61 at the bottom of the short intake pipes are provided to separate the air-fuel mixture to flow in different directions and guide it into the different cylinders.

The humidity of the wet air is determined by the speed of the air passing over the water surface 17. In other words, it is determined by the degree of vacuum in the cylinder because the air speed is in direct proportion to the degree of vacuum in the cylinder. The degree of air humidity is therefore automatically controlled by the conditions of the engine so as to meet the air requirement for combustion. After the wet air enters the cylinder, the expansion of the volume of moisture caused by heat absorption prolongs the combustion time and increases the pressure in the cylinder. Consequently it indirectly augments the compression ratio and the horsepower. In the meantime, the temperature of the cylinder is reduced as a result of the expansion of the volume of moisture through absorption of the high heat which would otherwise be sustained by the cylinder. The major objective of the wet air is thus accomplished.

The amount of compensatory air passing through the air suction control valve is controlled according to the degree of vacuum of the cylinder. If the suction force is at the maximum (at the time of idling speed of the engine), the spring 66 is compressed all the way up and the opening 72 underneath the stainless steel ball 65 is opened to its maximum to ensure that the largest amount of compensatory air flows therethrough to meet the requirements for the rich fuel condition. This avoids release of poisonous gas caused by incompletely burnt fuel in the cylinder. Similarly, when the engine is at a medium or high speed (i.e., the vacuum in the intake pipe is gradually reduced to nearly zero), the amount of compensatory air supplied to the systems is proportionately reduced because of the automatic adjustment of the air suction control valve. When no suction force exists, the stainless steel ball 65 falls back on the opening 72 and closes it completely so that no compensatory air will enter. Thus, the present invention is characterized in that it ensures complete combustion at all times by supplying an appropriate amount of compensatory air to meet the needs of the cylinder under different conditions.

7. The results of the invention:

The compensatory air improves the atomization and uniform mixing of the air-fuel mixture and achieves the complete combustion of the fuel. Furthermore, it can also accomplish the heat energy recovery and supercharge effects by the process of humidification and preheating. Therefore, it not only reduces the temperature of the cylinders and the exhaust system (this is neglected in the aforesaid conventional fuel-saving device) but also thoroughly eliminates air pollution by poisonous exhaust gas of automobiles. In particular, the power generated from unit mixture is increased, and in consequence, the fuel consumption is reduced and the life of the engine will be prolonged.

(1) Increasing air supply efficiency: The amount of air supply is increased by 10%. This amount of compensatory air can be adjusted from zero (when the air suction control valve is closed) to 6 liters/-second (when the valve is fully open).

(2) Reducing CO, HC and NO$_x$ in the exhaust gases by 80-95%.

(3) Increasing thermal efficiency of the engine by 10-30%.

(4) Saving fuel by 15-30%.

(5) Lowering temperature in the engine and the exhaust system by 25%.

8. Advantages of the invention:

(1) Requiring no additional power.

(2) Applicable to all kinds of gasoline and diesel engines.

(3) Easy installation (in less than one hour).

(4) Low construction cost.

The invention is not restricted to the particular construction that is shown and described, since it will be apparent to those skilled in the art that variations may be made without departing from the scope of the invention as defined in the appended claims.

I claim:

1. An internal combustion engine, including:

means defining at least one combustion chamber, an exhaust manifold, exhaust pipe means connected to the exhaust manifold for conducting exhaust gases away from the combustion chamber, means defining an air inlet conduit whereby air for combustion of fuel is introduced into the combustion chamber, said air inlet conduit having a main inlet and at least one auxiliary inlet for introducing main and auxiliary air flows respectively into said air inlet conduit and being formed with a venturi constriction at a position downstream of said main inlet, said auxiliary inlet opening into said air inlet conduit at the position of the narrowest region of said constriction, air filter means, air heater means connected to receive filtered air from the air filter means for heating said filtered air and comprising at least two members which are secured together to define a central opening through which said exhaust manifold extends, said members together defining a substantially annular passageway which extends about the exhaust manifold in heat-exchange relationship therewith and is provided with an inlet connection connected to the air filter means and with an outlet connection, a humidifier connected to receive filtered and heated air from the air heater means for humidifying said filtered and heated air and comprising a vessel for containing humidification liquid, said vessel having an upper region at which it is provided with air inlet connection which is connected to the outlet connection of the air heater means and with an air outlet connection, the vessel having therewithin a sponge member having an upper surface which extends substantially horizontally within the vessel, the shape and size of the upper surface of the sponge member being substantially identical to the shape and size of the horizontal section of the interior space defined by the vessel at the level at which the upper surface is located.

preheater means connected to receive the filtered and humidified air from the humidifier for heating said air, and comprising a member which defines an opening of substantially the same diameter as the exhaust manifold and the exhaust pipe means and is connected in series between the outlet of the exhaust manifold and the inlet of the exhaust pipe means, and a duct passing diametrically through the opening and having an inlet end which is connected to the air outlet connection of the humidifier vessel and also having an outlet end, and an air suction control valve connected between said preheater means and said auxiliary inlet to said air inlet conduit for controlling passage of air from said preheater means to said auxiliary inlet and comprising a valve body defining a passageway having two ends extending therethrough and connected at one end to said auxiliary inlet and at its other end to the outlet end of said duct, the passageway having a reduced diameter portion intermediate its ends, and the valve also comprising a ball positioned in the passageway between the reduced diameter portion and said one end, an abutment member between said ball and said one end, and a resilient member positioned in the passageway and effective between the abutment member and the ball to urge the ball towards said reduced diameter portion of the passageway for blocking the passageway, whereby said air suction control valve operates in response to increase in pressure in the combustion chamber to reduce the flow of air from the preheater means to the auxiliary inlet.

2. An internal combustion engine as claimed in claim 1, further comprising a carburetor for producing at an outlet thereof a flow of air having liquid fuel suspended therein in atomized form, the outlet of the carburetor being connected to the main inlet of said inlet conduit and said auxiliary inlet opening into said air inlet conduit at a position downstream of said main inlet.

3. An engine as claimed in claim 1, wherein said air heater means comprise two substantially identical semicircular metallic members, each formed with two diametrically opposite flanges, the two flanges of one of said members being secured to the two flanges respectively of the other member, two of the flanges being formed with the inlet and outlet connections respectively of the air heater means.

4. An engine as claimed in claim 1, further comprising a plate mounted in the humidifier vessel adjacent to the air inlet connection thereof, the plate being inclined to the horizontal and being positioned to direct flow of air from said air inlet connection over the upper surface of said sponge member.

5. An engine as claimed in claim 1, wherein the humidifier is provided at a lower region thereof with a drain outlet connection, said drain outlet connection having an outlet opening and means for sealing said outlet opening, and also having a side opening connected to the lower end of a pipe whose upper end is positioned above the level of the upper surface of the sponge and is provided with a filter screen, whereby application of vacuum to the outlet connection of the humidifier may cause air to be drawn into the vessel by way of said filter screen, said pipe and said side opening of the drain outlet connection.

6. An engine as claimed in claim 1, wherein the air outlet connection of the humidifier is provided with a filter screen.

7. An engine as claimed in claim 1, wherein said duct is made of copper alloy and is provided with a helical heat-transfer fin at its exterior where it passes through said opening.

8. An engine as claimed in claim 1, wherein said preheater means is provided with an annular protrusion which bounds said opening and is fitted into the outlet of the exhaust manifold and is also formed with an annular recess extending about said opening and having the inlet of said exhaust pipe means fitted therein.

9. An engine as claimed in claim 1, further comprising a stainless steel filter screen fitted in said duct.

10. An engine as claimed in claim 1, wherein the position of said abutment member is adjustable, thereby to vary the force urging the ball into engagement with the reduced diameter portion of the passageway.

11. An engine as claimed in claim 10, wherein said valve body is provided with an outlet connection member for connecting said one end of the passageway to said auxiliary inlet, the passageway being internally threaded at said one end and said outlet connection member being externally threaded whereby the position of said outlet connection member along said passageway is adjustable, said outlet connection member being engaged by said resilient member and constituting said abutment member.

* * * * *